United States Patent Office 3,137,643
Patented June 16, 1964

3,137,643
PROCESS FOR POLYMERIZING ISOOLEFINS
Edward R. Bell, Concord, and William S. Anderson, Oakland, Calif., assignors to Shell Oil Company, a corporation of Delaware
No Drawing. Filed Dec. 14, 1959, Ser. No. 859,129
6 Claims. (Cl. 204—154)

This invention relates to the polymerization of isoolefins. More particularly, the invention relates to a process for polymerizing isoolefins using high energy ionizing radiation. Specifically, the invention provides a new and highly efficient process for preparing high molecular weight polymers of isoolefins, and particularly isobutylene.

It is an object of the invention to provide a new process for polymerizing isoolefins. It is a further object to provide a process for converting isoolefins into rubbery high molecular weight solid polymers. It is a further object to provide the method for preparing isoolefin polymers without the use of metallic catalyst and special solvents. It is a specific object to provide a process for co-polymerizing isobutylene with small amounts of diolefins without the use of metallic catalysts and special solvents to produce useful vulcanizable rubbery polymers. It is a further object to provide a process for polymerizing isoolefins using high energy ionizing radiation. These and other objects will be apparent from the following detailed description thereof.

It has now been discovered that these and other objects may be accomplished by the process of the invention which comprises exposing the isoolefin in condensed phase to high energy radiation of substantial penetrating power from an external source and particularly to a high energy stream of electrons or photons, at a temperature between about $-70°$ C. and $-180°$ C. in the presence of not more than $10^{-3}$ mol percent of molecular oxygen. It has been found that by the use of this process one is able to obtain in high yields high molecular weight solid polymers of isoolefins which polymers show promise for use as rubbers, in the preparation of high impact plastic products, and for various other uses.

At the present time there are recognized in the art two fundamentally different mechanisms by which the polymerization of monomers in chain reactions can be catalyzed—free-radical and ionic catalysis. These are discussed in numerous publications. For a brief summation, reference may be had to "Encyclopedia of Chemical Technology," Kirk and Othmer, vol. 10, 1953, pp. 962–965.

It has been recognized for some time that chain polymerization of the free-radical type can be initiated by ionizing radiation. This is discussed in some detail, for example, by A. Charlesby in "The Effect of Radiation on Materials," edited by J. J. Harwood et al., Reinhold Publishing Corp., New York, 1958, chapter 10, pp. 267 et seq. The following is quoted from pp. 267–268:

". . . while the primary effects of irradiation are to produce ionization and excitation, the polymerizations kinetics follow those associated with a radical initiator rather than an ionic one. It must therefore be concluded that the initial ionization gives rise to radicals similar to those obtained by chemical methods and that only these radicals initiate the final polymerization observed. Polymerization can also be initiated by ionic methods but so far there is no published information to indicate that this does in fact occur with radiation."

Charlesby continues with a discussion of the kinetics of radiation-initiated free-radical reactions, pointing out that conversion rate is generally proportional to the square root (or, with certain monomers, the 0.8th power) of radiation intensity at low intensities, that at higher intensities lower molecular weight products are obtained and the yields are lower, and at very high intensities little or no polymerization takes place.

There are numerous differences between polymerization which proceed by a free-radical mechanism and those which proceed by a cationic mechanism. The characteristics of free-radical polymerization under the influence of ionizing radiation are known. The general characteristics of cationic polymerization by use of acidic catalysts are also known. The particular characteristics of cationic polymerization under the influence of ionizing radiation have not been described prior to this invention.

While conversion rates in free-radical polymerizations are proportional to a fractional power of radiation intensity, as just described, ionic polymerization rates are generally directly proportional to radiation intensity. Hence, relatively high radiation intensities, e.g., of $10^6$ to $10^{12}$ rads per hour may be usefully employed here, whereas intensities in this range result in substantial reduction in G value (energy yield) in free-radical type conversion.

Free-radical polymerizations are generally characterized by induction periods of varying extent, often up to several hours, occasioned by the adventitious presence of trace impurities. Ionic polymerizations are not usually subject to such induction periods. In numerous experiments carried out according to this invention, no induction periods were found to occur.

Polymerization rates are generally much higher in ionic than in free-radical polymerizations. For certain monomers, at least, ionic polymerization rates are faster than any known radical polymerization rate. Hence, a given amount of polymer can be produced in a much shorter time by an ionic polymerization. This relation has been found to be true for reactions initiated by ionizing radiation.

Radiation-induced free-radical polymerizations are characterized by post-irradiation polymerization. Ionic polymerizations stop essentially immediately after irradiation is discontinued. Hence, ionic polymerization, utilizing irradiation, is more easily controllable.

Polymers produced by free-radical polymerization under the influence of ionizing radiation tend to be irregular, including cross-linking and branching. Ionic polymers produced under irradiation tend to be highly linear.

A very important difference between free-radical-initiated and cation-initiated chain polymerization is that the temperature coefficient of the former is positive while that of the latter is negative, i.e., ionic polymerization proceeds successfully at, and in fact, requires relatively low temperatures.

As stated previously, it was not known to the art, at the time this invention was made, that ionizing radiation can initiate ionic types of polymerization chains. Similarly, it was not known that isobutylene or similar isoolefins can be polymerized to very high molecular weights, e.g., 100,000 or higher, by exposure in condensed phase to ionizing radiation.

It has now been found that isobutylene and similar isoolefins can be polymerized to high molecular weight polymers, in the range from 100,000 to 2,000,000 and higher, by exposing a mass of the isoolefin in condensed phase, i.e., liquid or solid phase, at a temperature between about $-70°$ and $-180°$ C. to penetrating ionizing radiation from an external source. It has further been found that this reaction apparently proceeds by an ionic mechanism.

Various advantages in cationic polymerization over the free-radical type have just been described. However, the process of this invention also has advantages over the hitherto-known catalytic cationic polymerization of isoolefins. Catalytic systems using such conventional catalysts as $BF_3$ and $AlCl_3$ are extremely sensitive to the manner in which catalyst is distributed in the reaction mixture. The usual fast reaction rates result in rapid completion of monomer conversion, often before catalyst has been evenly distributed throughout the reactor. Consequently it may be difficult to achieve reproducible polymer properties. This difficulty is completely avoided by operating in accordance with this invention. Furthermore, the elaborate product washing steps which are required when using conventional catalysts are obviated.

The isoolefins to be polymerized by the process of the inventions include among others isobutylenes, isoamylenes, isohexylenes, and the like. Particularly preferred is isobutylene; next preferred are the single branched alpha-olefins containing from 5 to 6 carbon atoms.

The isoolefins used in the process should be substantially pure. Purity of at least 95% and preferably 97% is desired.

It is especially important to avoid the presence of even traces of certain impurities which have been found to inhibit this reaction. Molecular oxygen is objectionable, as are certain oxygenated compounds, e.g., carbon dioxide, ethanol, methanol, acetone, ether, and others.

A particularly undesirable contaminant is diisobutylene (2,4,4-trimethyl-2-pentene) which tends to suppress polymerization by causing chain termination. It has been found that pure isobutylene, after storage for an extended period in a metal cylinder, could no longer be efficiently polymerized. Also, it was found that the objectionable impurities concentrate in the residual liquid isobutylene when process feed is withdrawn from the vapor zone of a cylinder over a period of time. Redistilled monomer no longer contained the impurities in objectionable amounts. Even very small amounts, e.g., 0.1%, of such impurities can lead to a substantially complete failure in attempts to polymerize isobutylene to a rubbery polymer by radiation initiated reaction.

The present invention utilizes ionizing radiation which has the power to penetrate to a substantial depth, i.e., at least about 1 centimeter, into a mass of isobutylene in condensed phase. This is sometimes referred to herein as radiation of substantial penetrating power. In accordance with this invention, a mass of isobutylene or the like in condensed phase is exposed to such radiation from a source which is not finely dispersed within said mass. The radiation may be introduced into the condensed mass, held in a vessel, through a suitable window in the vessel or by placing an intensive source of radiation, such as a canned mass of a gamma-ray emitter, into the vessel containing the monomer. To simplify terminology, such sources which are not finely dispersed within the mass are referred to herein as "external" sources.

The kinds of radiation suitable for use in the present invention include high energy electrons, protons and photons. Electron beams are suitably produced by electron accelerators such as the Van de Graaff, resonance transformers and linear accelerators or by a suitable arrangement of certain isotopes, e.g., strontium 90. High energy photons suitable for use are, for example, X-rays produced by conventional X-ray tubes and electron accelerators and gamma rays which may be produced by decay of radioactive material such as cobalt 60, cesium 137 and fission products. Although somewhat different effects may be observed in irradiation by heavy particles, the present invention also contemplates particularly the use of the high energy protons or neutrons. Proton beams are produced, for example, by accelerators such as Van de Graaff, linear accelerators and cyclotrons. Fast neutrons may be obtained within a nuclear reactor or may be obtained as a beam out of a nuclear reactor. Fast neutrons act on hydrocarbons mainly by transferring their energy to protons, which, being charged, induce ionization and excitation as they pass through the monomer mixture.

The devices suitable for producing beams of electrons, protons, X-rays and fast neutrons are well known in the art and need not be described here in detail.

Methods and apparatus for irradiating materials by means of radiation resulting from decay of radioactive substances are also well known. Sources such as rods containing a high concentration of cobalt 60 are used in various arrangements for the irradiation of materials as described, for example, in the pertinent paper by Burton et al., Nucleonics, 13 (No. 10), 74 (1955), and references cited therein.

A preferred process comprises exposing of the monomer mixture to radiation by passing it through a nuclear reactor which may at the same time be employed for power producing purposes or may be utilized exclusively for polymerization. A suitable reactor is described in substantial detail in the Fermi et al. Patent U.S. 2,708,656.

The total dosage needed to effect polymerization will vary with the various monomers. Preferred total dosage varies from $10^5$ to $5 \times 10^6$ rads; dosages of up to $5 \times 10^7$ rads or more, calculated on the total mixture, may be employed if polymer is removed from the irradiation zone after it is formed. A rad is defined as 100 ergs of ionizing energy absorbed per gram of the irradiated mixture.

The dosage rate will also vary considerably. Preferred dosage rate varies from about $10^4$ to $10^{12}$ rads per hour, and still more preferably $10^5$ to $10^{10}$ rads per hour. In systems in which the radiation reaches only a portion of the total mass of monomer contained in a vessel, e.g., where an electron beam penetrates only into the upper part of a vessel, the dose rate calculated on the basis of the amount of material in the volume actually reached by the radiation is called the "instantaneous dose rate." The above numerical values are applicable.

The radiation is conducted at a temperature between about $-70°$ C. and $-180°$ C. The radiation is preferably accomplished at tempreatures ranging from below $-80°$ C. to $-140°$ C. These temperatures may be obtained by conventional techniques such as use of liquid nitrogen, Dry Ice, boiling ethylene and the like.

The polymerization is preferably carried out in bulk or solvent systems. "Bulk polymerization" is the accepted term for polymerization in the pure liquid monomer phase. If solvents are employed, they preferbaly are inert diluents such as liquid ethane, liquid butane, and liquid methyl or ethyl chlorides. These diluents are preferably utilized in proportion of from .5 to 5 volumes per volume of monomer.

The process is conducted in an inert atmosphere. This is preferably accomplished by use of high vacuum. The molecular oxygen preferably should not be more than $10^{-3}$ mol percent.

When carrying out the process of the invention by means of radiation with a beam of particles, the reaction mixture is preferably contained in a cell constructed of a suitable material and having a window transparent to the beam. The reaction mixture may be irradiated statically or the mixture may be passed through a conduit having a window transparent to the beam so that it is irradiated in a flow system. In either case, provision should be made to remove a small amount of gas, generally mainly hydrogen, which may be formed during the radiation. Table 1 illustrates suitable windows and cell construction materials to be used with various types of radiation. The whole cell or conduit within the field of radiation may be made of the transparent material.

TABLE 1

| Radiation | Cell Material | Window |
|---|---|---|
| X or Gamma | ¼" Al, ⅒" S.S. (or any other materials). | None needed. |
| Fast neutrons | Aluminum (or metals of low capture cross section). | Do. |
| Electrons | Any | Thin aluminum foil, thin S.S. foil, or other thin metals. |

One of the preferred means of exposure, due particularly to the relatively low cost of the treatment, comprises placing of suitably canned spent nuclear fuel elements (removed from nuclear reactors) in a tank containing the monomers. An ordinary storage tank, properly shielded may be used, and the mixture of monomers should be circulated, so as to effect uniform exposure to the spent fuel elements.

In effecting radiation, the feed mixture may be introduced into the interior of a reactor, as, for example, in a well designed for that purpose or through a cooling tube or tubes.

The mixtures to be treated may be introduced into the reactor or into the path of the fast neutron or high energy beam in a continuous flow through a conduit, or may be placed in a receptacle in the reactor or in the path of the beam and subjected to irradiation while they are substantially static.

A specially preferred mode of practicing this invention comprises prompt removal of polymer from the radiation zone as quickly as possible after it has been formed. It has been found that polymers produced in accordance with this invention quickly become insoluble in the polymerization mixture. The insoluble polymer is precipitated as small particles which are denser than liquid monomer and settle quickly by gravity. It has further been found that the polymers initially formed have high molecular weights in the desired range, but their molecular weight decreases substantially if the polymer is subjected to additional radiation.

It is, therefore, important that freshly formed polymer be removed from the radiation zone as quickly as practicable. Numerous different ways of doing this may be resorted to. For example, consider a batch irradiation in which liquid isobutylene at −100° C. is contained in a vented, refrigerated, closed vessel 12 inches deep, having a window of aluminum foil in the top. The mass of isobutylene is irradiated with a beam of electrons of 3 million volts with a current of 50 ma. The beam penetrates ca. 2 cm. into the mass. Polymer is formed at the rate of about 6,000 grams per hour. This polymer settles to the bottom of the vessel quite rapidly and hence receives no additional radiation. If the same vessel were to be used to irradiate isobutylene with gamma radiation, which penetrates much more deeply, polymer settled to the bottom of the vessel would receive additional radiation and would, therefore, gradually decrease in molecular weight. To avoid this, the location where polymer settles out must be protected from radiation, or polymer must be removed frequently or continuously to a location outside the radiation zone. Suitable apparatus for achieving this result includes flow systems in which monomer passes through an irradiation zone, the irradiated mixture passes to a polymer separation zone (e.g., a settler or hydrocyclone) in which polymer is separated and recovered and gas formed during the irradiation may be withdrawn, and unconverted monomer is returned to the irradiation zone.

When a static mass of isoolefin is irradiated with a high energy beam, rubber may form so quickly that it forms a skin which remains over the top of the reaction mass. This difficulty is avoided either by reducing the dose rate in such a case or by providing sufficient agitation. Carrying out the reaction in a boiling solution of isobutylene in ethane, for example, is a way of avoiding skin formation.

Another preferred mode of practicing this invention comprises spraying polymerizable monomer, e.g., isobutylene as such or in solution in a solvent such as liquid ethane, at a temperature between −80° C. and −180° C., through a nozzle into the top of a tower containing inert gas, such as nitrogen, ethylene, helium or argon at −80° C. to −180° C. and a pressure from 1 to 100 atmospheres. The droplets of monomer or solution fall through a beam of ionizing radiation which polymerizes the monomer. Unpolymerized monomer is recovered and recirculated.

This system is particularly applicable to the use of electron beam irradiation with its lower penetrating power, relative to gamma or X-rays. It permits very rapid removal of the polymer from the radiation zone, easy temperature control, and avoids the necessity for mechanical agitation.

While the process has been described above as method for producing homopolymers of the isoolefins, it may also be used to produce copolymers of the isoolefins with no more than 10 mol percent of other ethylenically unsaturated monomers, and particularly those having a terminal $CH_2=C$ group, such as styrene, isoprene, butadiene, propylene, butylene, piperylene, ethylene, vinyl ethyl ether, vinyl butyl ether and the like. Mixtures of the isoolefins alone or with these dissimilar monomers may also be used. In making such copolymers it is preferred to keep the amount of the above-noted dissimilar monomers in the reaction mixture well below 10 mol percent, and suitably at no more than 5 mol percent.

The polymers prepared by the process will be of relatively high molecular weight and soluble in a great variety of oils and resins. The molecular weights of the products will preferably vary from about 100,000 to 2,000,000 as determined by intrinsic viscosity measurements in toluene.

The polymers and copolymers produced by the process of the invention may be utilized for a great many important industrial applications. The polymers may be used, for example, in the compounding of rubbers to form molded rubber articles, such as tires, belts, tubes and the like or may be added alone or with other polymeric materials as polystyrene to improve specific properties, such as impact resistance. The polymers of the invention may also be used in the preparation of impregnating and coating compositions or may be combined with asphalts, tars and the like to form surfacing coatings for roads and walkways.

The polymers prepared by the process of invention which contain some unsaturation, such as, for example, the copolymers of the isoolefins and the diolefins as isoprene and butadiene, are particularly valuable in that they may be vulcanized to form good cross-linked rubbers useful in making tires, etc. In forming rubbers of this type, it is preferred to compound the polymers with the necessary ingredients, such as, for example, tackifiers, plasticizers, stabilizers, oils, carbon black and the vulcanizing agent, and then heating the mixture. Preferred vulcanizing agents include, among others, sulfur, sulfur chloride, sulfur thiocycanate, thiuram polysulfides and other organic polysulfides. These agents are preferably used in amounts varying from about 0.1 to 10 parts per 100 parts of rubber. Vulcanization temperatures range from about 100° C. to about 175° C. Preferred temperatures range from about 125° C. to 175° C. for a period of 15 to 60 minutes.

The homopolymers of the isoolefins may also be converted to vulcanizable products by chlorination and then dehydrochlorinating by conventional procedures. The products so prepared may be vulcanized as noted above.

The polymers and copolymers of the invention are also of particular value as additives for greases and oils and as viscosity index improvers and additives for extreme pressure lubricants.

A particular merit of rubbers produced from these polymers and copolymers is their resistance to chemical attack by oxygen or ozone. Another advantage is their low permeability to gases, which makes them especially suitable for use in inner tubes and the like.

To illustrate the manner in which the invention may be carried out, the following examples are given. It is to be understood, however, that the examples are for the purpose of illustration, and the invention is not to be regarded as limited to any of the specific conditions cited therein.

Example I

This example illustrates the preparation of polyisobutylene using X-rays from a Van de Graaff accelerator.

Substantially pure isobutylene monomer is introduced into a reaction vessel and vacuum applied to reduce pressure to $10^{-5}$ mm. Hg at $-195°$ C. The temperature is then raised to $-155°$ C. by use of frozen pentane in liquid pentane. The solid isobutylene is then irradiated in an X-ray beam from a Van de Graaff accelerator to a radiation dosage of $1.7 \times 10^{-6}$ rads. This is accomplished by using a dosage rate of $3.4 \times 10^6$ rads per hour for 30 minutes. The resulting product obtained with an energy yield, G, of 1150 is a rubbery polymer having a viscosity average molecular weight of approximately $1.8 \times 10^6$. The polymer is useful as a compounding agent for polystyrene and various synthetic rubbers.

Example II

Example I is repeated with the exception that the temperature is $-125°$ C. The isobutylene is in liquid phase during the irradiation. In this case, the resulting product is a rubbery polymer having a viscosity average mol wt. of $8.5 \times 10^5$ obtained with an energy yield, $G=4,850$.

Example III

Example I is repeated with the exception that the temperature is $-80°$ C., the total dose is $2.5 \times 10^6$ rads, and the time 45 minutes. The isobutylene is in liquid phase during the irradiation. In this case, the resulting product is a rubbery polymer having a viscosity average mol wt. of $3 \times 10^5$ obtained with an energy yield $G=1,150$.

Example IV

Example I is repeated with the exception that isoamylene is used in place of isobutylene. A rubbery high molecular weight polymer is also obtained.

Example V

Examples I to III are repeated with the exception that the monomer is irradiated by exposure to spent uranium reactor fuel elements. In this case also a rubbery polymer is obtained.

Example VI

Example I is repeated with the exception that the temperature is changed to a $-180°$ C. The isobutylene, in this case, is in solid phase during irradiation. A rubbery high molecular weight polymer having properties similar to the polymer produced in Example I is obtained.

Example VII

This example illustrates the preparation of a copolymer of isobutylene and propylene using X-rays from a Van de Graaff accelerator.

Isobutylene containing 10% propylene is introduced into a reaction vessel and vacuum applied as in Example I. The temperature is then raised to $-80°$ C. The liquid mixture is irradiated in an X-ray beam from a Van de Graaff accelerator to a radiation dosage of $1.7 \times 10^6$ rads. This is accomplished by using a dosage rate of $6.8 \times 10^6$ rads per hour for 15 minutes. The resulting product is a rubbery copolymer having a viscosity average mol wt. of about $2.5 \times 10^5$, obtained with an energy yield, $G=165$.

Example VIII

Example VII is repeated with the exception that the temperature is reduced to $-125°$ C. and in another run to $-155°$ C. In both cases, the product is a rubbery copolymer having a viscosity average mol wt. of about $8.5 \times 10^5$ at the lower temperature and $10^6$ at the upper.

Example IX

Example VIII is repeated at $-125°$ C. with the exception that 50% propylene is added. The resulting product is a rubbery polymer with a viscosity average mol wt. of $4.7 \times 10^5$.

Example X

This example illustrates the preparation of a copolymer of butadiene and isobutylene using an electron beam from a Van de Graaff accelerator and the compounding of the copolymer.

A mixture of 5 parts butadiene and 95 parts isobutylene is introduced into a reaction vessel and the temperature of the vessel reduced to $-100°$ C. This liquid mixture is then irradiated in an electron beam from a Van de Graaff accelerator to a radiation dosage of $5 \times 10^5$ rads. This is accomplished by using a dosage rate of $10^6$ rads per hour for 0.5 hour. The resulting product is a white solid polymer.

100 parts of the above polymer are compounded with 2 parts phenyl-beta-naphthylamine, 5 parts zinc oxide, 3 parts stearic acid, 50 patrs High Abrasion Furnace Black, 1.2 parts of N-cyclohexyl-2-benzothiazole-sulfenamide and 0.8 part of sulfur, and the product cured for 20 minutes at $135°$ C. The resulting product is a hard rubber sheet that can be used in the formation of belts, tubes and the like.

Example XI

This example illustrates the preparation of a coplymer of isoprene an disobutylene using an electron beam from a Van de Graaff accelerator.

A mixture of 5 parts of isoprene and 95 parts isobutylene is introduced into a reaction vessel and the temperature of the vessel reduced to $-100°$ C. This liquid mixture is then irradiated in an electron beam from a Van de Graaff accelerator to a radiation dosage of $5 \times 10^5$ rads. This is accomplished by using an average dosage rate of $10^6$ rads per hour for 0.5 hour. The resulting product is a white solid polymer.

Example XII

This example illustrates the preparation of a copolymer of piperylene and isobutylene using an electron beam from a Van de Graaff accelerator.

A mixture of 5 parts of piperylene and 95 parts of isobutylene is introduced into a reaction vessel and the temperature of the vessel reduced to $-80°$ C. This liquid mixture is then irradiated in an electro beam from a Van de Graaff accelerator to a radiation dosage of $5 \times 10^5$ rads. This is accomplished by using an average dosage rate of $10^6$ rads per hour for 0.5 hour. The resulting product is a white solid polymer.

Example XIII

This example illustrates the preparation of a copolymer of isoprene and isobutylene using X-rays from a Van de Graaff accelerator, and the compounding of the copolymer.

A mixture of 1.3 parts of isoprene and 98.7 parts isobutylene is introduced to a reaction vessel and the temperature of the vessel reduced to $-80°$ C. This liquid mixture is then irradiated in an X-ray beam from a Van de Graaff accelerator to a radiation dosage of $2.5 \times 10^6$ rads. This is accomplished by using a dosage rate of $1.25 \times 10^6$ rads per hour. The resulting product is a white, solid polymer, obtained with an energy yield, $G=770$.

One hundred parts of the above polymer are compounded with 0.15 part phenyl-beta-naphthylamine, 5 parts zinc oxide, 1 part stearic acid, 50 parts High Abrasion Furnace Black, 1 part benzothiazole disulfide, 1 part tetramethylthiuram disulfide, 0.3 part N-methyl-N'-nitroso-p-nitrosaniline and 2 parts of sulfur. Portions of the compounded mixture are cured for 15, 30, 45, and 60 minutes respectively at a temperature of $307°$ F. and several of their properties determined. These properties are listed in Table 2. The properties show the compounded material to be a rubber which is satisfactory for many commercial uses.

TABLE 2

| Cure Time, minutes | 15 | 30 | 45 | 60 |
|---|---|---|---|---|
| Modulus of elasticity at 300% elongation | 1,067 | 1,509 | 1,561 | 1,607 |
| Tensile strength at break | 2,466 | 2,709 | 2,630 | 2,546 |
| Elongation at break, percent | 598 | 521 | 500 | 441 |

Example XIV

This example illustrates the preparation of polyisobutylene using an electron beam from a Van de Graaff accelerator. In this example the isobutylene is present in solution.

600 cc. of an equimolar mixture of ethane and isobutylene is placed in a vessel and maintained at its boiling point of −75° C. The vessel is irradiated with an electron beam of 1 microampere of 3 million volt electrons for 20 minutes. It is observed that rubber is formed in the vessel in small particles which sink readily to the bottom as formed. The instantaneous dose rate during irradiation is $10^8$ rads per hour and the total dose received, averaged on the entire reactor contents, is $6.7 \times 10^5$ rads. Ten grams of rubber are produced, indicating a G value of 480. The viscosity average molecular weight of the rubber is 450,000.

Example XV

In a series of experiments, some of which were described separately above, isobutylene is irradiated at temperatures from 0° to −155° C. Table 3 summarizes the pertinent results. Experiment XV-1 is carried out with an electron beam, experiments XV-2 through 5 with X-ray irradiation.

TABLE 3

| Experiment No. | Temperature, °C. | Radiation Dose, Rads | Product, Mol Wt. | Efficiency of Utilizing Radiation G-value |
|---|---|---|---|---|
| XV-1 | 0 | −10$^7$ | a 23,000 | <100 |
| XV-2 | −40 | 2×10$^6$ | (a b) | 70 |
| XV-3 | −78.5 | 1.9×10$^6$ | c 450,000 | 1,310 |
| XV-4 | −125 | 1.7×10$^6$ | c 850,000 | 4,850 |
| XV-5 | −155 | 1.7×10$^6$ | c 1,800,000 | 1,150 | a Polymer was grease-like
b Molecular weight not determined
c Polymer was rubbery.

These data show that polymerization of isobutylene is most efficient at −125° C. (highest G value); also, that it is not practical to irradiate isobutylene at temperautres much above −80° C., partly because the molecular weight decreases to undesirably low values, but particularly because there is a drastic drop in efficiency of utilization of radiation. From a plot of the above data it is seen that the G value at −70° C. is less than one third of what it is at −78.5° C. It is also noted that polymer produced at 0° and −40° C. is not rubbery, unlike that produced at −78.5° and lower temperatures.

Example XVI

This example illustrates the deterioration caused in polyisobutylene by excessive exposure to radiation. A number of samples are prepared by irradiating ampoules containing isobutylene, held at −78.5° C., by an X-ray beam from a Van de Graaff generator. Table 4 shows the pertinent results.

TABLE 4

| Experiment No. | Dosage, Rads | Conversion, Percent | Molecular Weight |
|---|---|---|---|
| XVI-1 | 0.625×10$^6$ | 5.77 | 850,000 |
| XVI-2 | 1.875×10$^6$ | 14.41 | 450,000 |
| XVI-3 | 2.50×10$^6$ | 17.80 | 350,000 |

This application is a continuation-in-part of patent application Serial No. 711,803, filed January 29, 1958, now abandoned.

We claim as our invention:

1. An improved polymerization process which comprises providing a liquid reaction mass containing as sole polymerizable ingredients an isoolefin and at most 10 mole percent of other ethylenically unsaturated monomers at a temperature between −70° C. and −180° C., said reaction mass being in contact with an inert atmosphere, and exposing said reaction mass in an irradiation zone to no more than $5 \times 10^7$ rads of high energy ionizing radiation of substantial penetrating power from an external source while it is maintained in condensed phase at a temperature in said range and under sufficient agitation of exposed liquid to prevent skin formation, withdrawing the resulting particles of solid polymer from the irradiation zone as they are formed and recovering a rubbery polymer of at least about 100,000 molecular weight.

2. An improved process for copolymerizing isobutylene with a diolefin selected from the group consisting of butadiene, isoprene and piperylene which comprises providing a liquid reaction mass containing as sole polymerizable ingredients isobutylene and one of said diolefins in a molar ratio of at least 9:1 and free of diisobutylene, said reaction mass being at a temperature between −70° and −180° C. and in contact with an inert atmosphere, and exposing said reaction mass in an irradiation zone to no more than $5 \times 10^7$ rads of high energy ionizing radiation of substantial penetrating power from an external source while said mass is maintained in condensed phase at a temperature in said range and under sufficient agitation of exposed liquid to prevent skin formation, withdrawing the resulting particles of solid polymer from the irradiation zone as they are formed and recovering a rubbery copolymer of at least about 100,000 molecular weight.

3. An improved process for copolymerizing isobutylene with propylene which comprises providing a liquid reaction mass containing as sole polymerizable ingredients isobutylene and propylene in a molar ratio of at least 9:1 and free of diisobutylene, said reaction mass being at a temperature between −70° and −180° C. and in contact with an inert atmosphere, and exposing said reaction mass in an irradiation zone to no more than $5 \times 10^7$ rads of high energy ionizing radiation of substantial penetrating power from an external source while said mass is maintained in condensed phase at a temperature in said range and under sufficient agitation of exposed liquid to prevent skin formation, withdrawing the resulting particles of solid polymer from the irradiation zone as they are formed and recovering a rubbery copolymer of at least about 100,000 molecular weight.

4. An improved polymerization process which comprises providing a liquid reaction mass containing as sole polymerizable ingredients isobutylene and at most 10 mole percent of a diolefin selected from the group consisting of butadiene, isoprene and piperylene and being free of diisobutylene, said reaction mass being at a temperature below −80° C., exposing said reaction mass in an irradiation zone to high energy electron irradiation with an instantaneous dose rate of $10^6$ to $10^{10}$ rads per hour while maintaining it at a temperature below −80° C., maintaining sufficient agitation of exposed liquid to prevent skin formation, withdrawing the resulting particles of solid polymer from the irradiation zone as they are formed, and recovering said particles as a rubbery polymer of at least about 100,000 molecular weight.

5. An improved polymerization process which comprises providing a liquid reaction mass containing as sole polymerizable ingredients isobutylene and at most 10 mole percent of a diolefin selected from the group consisting of butadiene, isoprene and piperylene and being free of diisobutylene, said reaction mass being at a temperature below −80° C., exposing said reaction mass in an irradiation zone to high energy X-ray irradiation with an instantaneous dose rate of $10^6$ to $10^{10}$ rads per hour while maintaining it at a temperature below $-80°$ C., maintaining sufficient agitation of exposed liquid to prevent skin formation, withdrawing the resulting particles of solid polymer from the irradiation zone as they are formed, and recovering said particles as a rubbery polymer of at least about 100,000 molecular weight.

6. An improved polymerization process which comprises providing a liquid reaction mass containing isobutylene as sole polymerizable ingredient at a temperature between $-70°$ C. and $-180°$ C., said reaction mass being in contact with an inert atmosphere, exposing said reaction mass in an irradiation zone to no more than $5 \times 10^7$ rads of high energy ionizing radiation of substantial penetrating power from an external source while said reaction mass is maintained at a temperature in said range and under sufficient agitation of exposed liquid to prevent skin formation, withdrawing the resulting particles of solid polyisobutylene from the irradiation zone as they are formed and recovering rubbery polyisobutylene of at least about 100,000 molecular weight.

References Cited in the file of this patent
UNITED STATES PATENTS 2,982,762      Voeks et al. _____ May 2, 1961

FOREIGN PATENTS 665,262      Great Britain _____ Jan. 23, 1952

OTHER REFERENCES

Charlesby: "Atomic Radiation and Polymers," 1960, pages 42–43.

Mund et al.: "Bull. Classe Sci. Acad. Roy. Belgium," vol. 36 (1950), pages 610–615.

Schildknecht: "Vinyl and Related Polymers," published by Wiley and Sons (1952), pages 542–553.